United States Patent [19]

Scharf et al.

[11] 4,144,123

[45] Mar. 13, 1979

[54] INCORPORATING A CROSSLINKED POLYAMIDOAMINE CONDENSATION PRODUCT INTO PAPER-MAKING PULP

[75] Inventors: Emil Scharf; Rolf Fikentscher, both of Ludwigshafen; Werner Auhorn, Frankenthal; Werner Streit, Ludwigshafen, all of Fed. Rep. of Germany

[73] Assignee: BASF Aktiengesellschaft, Ludwigshafen, Fed. Rep. of Germany

[21] Appl. No.: 899,824

[22] Filed: Apr. 25, 1978

Related U.S. Application Data

[63] Continuation of Ser. No. 740,417, Nov. 10, 1976, abandoned, which is a continuation of Ser. No. 593,628, Jul. 7, 1975, abandoned.

[30] Foreign Application Priority Data

Jul. 19, 1974 [DE] Fed. Rep. of Germany ....... 2434816

[51] Int. Cl.$^2$ .............................................. D21D 3/00
[52] U.S. Cl. ........................ 162/164 R; 162/164 EP; 210/54
[58] Field of Search ...................... 260/2 BP, 29.2 EP; 162/164 R, 164 EP, 168 R, 168 N; 210/54 C; 528/334

[56] References Cited

U.S. PATENT DOCUMENTS

| | | | |
|---|---|---|---|
| 2,913,356 | 11/1959 | Schroeder | 162/164 EP |
| 3,642,572 | 2/1972 | Endres et al. | 162/164 EP |

*Primary Examiner*—S. Leon Bashore
*Assistant Examiner*—Peter Chin
*Attorney, Agent, or Firm*—Keil & Witherspoon

[57] ABSTRACT

Crosslinked water-soluble reaction products for the papermaking industry obtained by reacting
 (a) 1 part by weight of a polyamidoamine obtained by condensation of 1 mole of a dicarboxylic acid with from 0.8 to 1.4 moles of a polyalkylenepolyamine such as diethylenetriamine, up to 8 ethyleneimine units per basic nitrogen atom being optionally grafted onto the condensation product, with
 (b) from 0.3 to 2 parts by weight of a reaction product of a polyalkylene oxide having from 8 to 100 alkylene oxide units with epichlorohydrin, in aqueous solution at a temperature of from 20° to 100° C., the solution having a solids content of from 5 to 50% by weight. The viscosity of an aqueous solution containing 20% of the reaction product is from 300 to 2,500 centipoises at 20°C.

1 Claim, No Drawings

INCORPORATING A CROSSLINKED POLYAMIDOAMINE CONDENSATION PRODUCT INTO PAPER-MAKING PULP

This is a continuation of application Ser. No. 740,417 filed Nov. 10, 1976; which is a continuation application of Ser. No. 593,628, filed Jul. 7, 1975 both abandoned.

This invention relates to novel reaction products of polyamidoamines with higher molecular weight difunctional crosslinkers, which are valuable for use in the papermaking industry. The invention also relates to the manufacture and use of such reaction products, particularly as retention and drainage aids in the papermaking industry.

It is well known that polyethylenimine and, to a lesser extent, polypropyleneimine are useful in the papermaking industry as retention aids for fillers and fibers, as aids for improving the drainage rate during sheet formation and as flocculants in pulp recovery. Such products have been known for more than 30 years. New progress was achieved by the use of epichlorohydrin as crosslinker giving crosslinked polyethyleneimines such as are described, for example, in German Pat. No. 1,670,296. Finally, it is also known that crosslinking, for example with epichlorohydrin, of polyamidoamines, i.e. reaction products of such polyamines with dicarboxylic acids, gives paper auxiliaries which also constitute good fiber retention aids. However, in use, these groups of products suffer from the drawback that each shows its optimum effect only within a limited pH range. For example, crosslinked polyamines obtained according a German Patent 1,670,296 show best results only at neutral pH, whilst crosslinked polyamidoamines such as are disclosed in U.S. Pat. No. 3,250,664 exhibit optimum properties only at acid pH.

In papermaking, more or less rapid changes in manufacturing conditions from acid to neutral and vice versa are usually necessary when different types of paper are made, and this gave rise, at an early stage, to the desired to develop an auxiliary which is capable of producing optimum results both at neutral and at acid pH.

The next stage of development in this field satisfied this requirement and is described in U.S. Pat. No. 3,642,572, where the problem is solved by grafting ethyleneimine onto a polyamidoamine and then crosslinking with epichlorohydrin. These aids have hitherto given completely satisfactory results. However, one drawback thereof, which does not relate to the quality of the paper obtained, consists in the danger involved in using the monomeric ethyleneimine necessary for the manufacture of such agents, this substance being well known as one requiring increased care when used in synthesis techniques on account of its toxicity. Furthermore, this compound is not universally available, as it is not everywhere possible to carry out the process described in the cited patent without restrictions. Thus economical considerations have led to the problem forming the basis of the present invention, i.e. the problem of providing a paper auxiliary in the manufacture of which monomeric ethyleneimine is used not at all or only in small amounts and which nevertheless show the same or even better results when used in the papermaking industry.

It is becoming increasingly important to the paper manufacturer to improve the efficiency of the papermaking processes, this including, in particular, their acceleration. This consideration has led to a further problem forming the basis of the present invention, i.e. the problem of providing novel auxiliaries which accelerate drainage to a greater extent than the agents described in the last-mentioned reference and which increase the retention of fibers and fillers on the wire screen and further improve the flocculating action for pulp recovery without a return of the already solved problem relating to the use of such agents in both acid and neutral pH ranges. Thus, the present invention not only aims at avoiding the use of monomeric ethyleneimine but also at improvements designed to accelerate and thus cheapen the various papermaking processes.

The present invention relates to a process for the manufacture of nitrogen-containing condensation products by reacting polyamino compounds with polyalkylene oxide derivatives, of which the terminal hydroxyl groups have been reacted with epichlorohydrin, which process is characterized in that (a) one part by weight of a polyamidoamine obtained from 1 mole of a dicarboxylic acid having from 4 to 10 carbon atoms and from 0.8 to 1.4 moles of a polyalkene polyamine having from 3 to 10 alkyleneimine units and optionally containing up to 10% by weight of a diamine, which condensation products may optionally contain up to 8 grafted ethyleneimine units per basic nitrogen grouping, is reacted, at from 20° to 100° C., with (b) from 0.3 to 2 parts by weight of a polyalkylene oxide derivative of which the terminal hydroxyl groups have been reacted with at least equivalent amounts of epichlorohydrin, the reaction being carried to the formation of high molecular weight resins which are still just water-soluble and which have a viscosity of more than 300 mPa.sec when measured on a 20% aqueous solution at 20° C.

The principle of reacting such epichlorohydrin-treated polyalkylene oxide derivatives with nitrogen-containing compounds is known, per se, from German Published Application No. 1,932,394 and U.S. Pat. Nos. 3,691,110 and 3,215,654. More complicated reactions, in which such difunctional crosslinkers are involved, are revealed in German Published Application No. 2,162,567, in which the end products are described as being suitable for use in the papermaking industry, including for use as retention aids. However, the basic idea of these three references relates to the treatment of the condensation products thus obtained for the purpose of rendering them fully effective, which treatment consists either in post-crosslinking with epichlorohydrin or conversion to a water-soluble form using sodium bisulfite. The latter measure is described in U.S. Pat. No. 3,691,110.

Another teaching which reveals the principle of this reaction in German Published Application No. 1,546,290. In this case however the aforementioned difunctional polyalkylene oxide derivatives are reacted not with polyamido amines but only with polyalkylene polyamines, peferably low molecular weight polyalkylene polyamines. The only application mentioned in this reference is the use of such products as auxiliaries in the recovery of fibers and fillers from the effluents leaving paper machines. However, such agents are less suitable as fiber retention aids or drainage aids, since they are useful for these latter applications only within narrow pH ranges. Thus the process of the invention having the basic concept of using polyamido amines, maintaining specific proportions by weight and molar ratios and, above all, achieving specific final viscosities and, therefore, of obtaining novel products of optimum efficiency constitutes an unexpected advance in the art.

The polyalkylene polyamines to be used as starting materials in the manufacture of the products of the invention are well-known compounds which are commercially available and which are generally obtainable by condensing corresponding alkenyl diamines. They are also obtained as byproducts in the synthesis of ethylene diamine and are readily obtained by hydrogenation of acrylonitrile adducts.

Preferred suitable polyalkylene polyamines are those which contain from 2 to 6 alkylene bridges between the amino groups. Advantageously, use is made of those having from 3 to 10 basic nitrogen atoms in the molecule. Examples of suitable polyalkylene polyamines are diethylene triamine, triethylene tetramine, tetraethylene pentamine, dipropylene triamine, tripropylene tetramine and dihexamethylene triamine. The polyalkylene polyamines may be used as crude products or mixtures, if desired in the presence of small amounts of diamines. The amount of such diamines, preferably ethylene diamine, which may be present is preferably up to 10% by weight.

Suitable dicarboxylic acids for reaction with the said polyalkylene polyamines are those having from 4 to 10 carbon atoms such a succinic acid, maleic acid, adipic acid, glutaric acid, suberic acid, sebacic acid and terephthalic acid. In general, use is made of from 0.8 to 1.4 moles of polyamine per mole of dicarboxylic acid. If desired, up to 8 moles of ethyleneimine per basic nitrogen grouping may be grafted onto the reaction products according to U.S. Pat. No. 3,642,572. In this case, preferably from 2 to 8 ethyleneimine units are selected.

The other reactant is the polyalkylene oxide derivative whose terminal hydroxyl groups have been reacted with epichlorohydrin. Suitable compounds of this kind are generally those containing from 8 to 100 alkylene oxide units in the polyalkylene oxide prior to reaction with epichlorohydrin. Suitable polyalkylene oxides are mainly homopolymers and copolymers of ethylene oxide and/or propylene oxide, the proportion of propylene oxide groups advantageously being not more than 50% of the total alkylene oxide groups. We prefer to use block copolymers of the formula

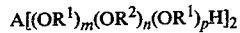

in which $R^1$ is an ethylene radical, $R^2$ is a 1,2-proppylene radical, m and p denote values of from 4 to 50, n denotes values of from 0 to 50 and A denotes the radical of a dihydric alcohol of from 2 to 6 carbon atoms or a polypropylene glycol radical having from 1 to 50 propylene oxide units, in which case n is equal to O. Individual representatives of such substances are ethoxylated or ethoxylated-oxypropylated dihydric alcohols such as glycol, propylene glycol, hexanediol and simple polypropylene glycol which may contain up to 50 propylene oxide units in the molecule. The latter substance, when ethoxylated on both sides, provides mixed block copolymers of ethylene oxide and propylene oxide. Thus the polyethoxylated or polyoxypropylated products are compounds having two terminal free hydroxyl groups. These terminal hydroxyl groups are the sites for subsequent reaction with epichlorohydrin. To this end, at least equivalent amounts and preferably from 1.1 to 1.5 moles of epichlorohydrin are used per OH group. There are produced β-hydroxy-γ-chloropropyl ether compounds which are converted to glycidyl ethers by the elimination of HCl, these being the compounds which have the crosslinking action on the aforementioned polyamidoamines. These compounds are referred to below as "crosslinkers."

The reaction of epichlorohydrin with the polyalkylene oxide derivatives proceeds according to well-known reaction mechanisms and is initiated by means of Lewis acids. Suitable Lewis acids are, for example, borofluoride etherate, phosphoric acid, sulfuric acid, perchloric acid, chloroacetic acid, aromatic sulfonic acids, zinc chloride and aluminum chloride. However, it is generally advantageous to use borofluoride etherate as catalyst (Lewis acid) for this reaction.

This high molecular weight difunctional crosslinkers are then reacted with the polyamidoamines, the amount of crosslinker used being from 0.3 to 2 parts by weight per part by weight of polyamidoamine. It will be appreciated that the amount of said difunctional compounds necessary for crosslinking depends on the constitution of the polyamidoamine used and that of the crosslinker itself. On the other hand, when crosslinking a given starting polyamidoamine with said high molecular weight crosslinkers in order to obtain a solution having a specific viscosity it will be necessary, on account of possible hydrolysis of the crosslinker, to use increasing amounts of crosslinker for increasing reaction temperature and increasing contents of water in the solution.

Use is made of the aforementioned amounts of crosslinker, preferably from 0.35 to 1.8 parts by weight, per part by weight of polyamidoamine. The crosslinking reaction is advantageously carried out in a 5 to 50% and preferably 10 to 30% w/w aqueous solution, based on the total weight of the reactants. The amount of crosslinker necessary to achieve the desired degree of crosslinking may be added to the reaction solution either all at once or in portions. The course of the reaction is followed by observing the increase in viscosity of the aqueous solution. The portion-wise procedure is always preferable, since the reaction can be better controlled in this manner and the risk of the reaction mixture gelling is much less. Furthermore, the portion-wise addition of the high molecular weight crosslinker obviates the addition of an excessive quantity and makes it easy to obtain a specific viscosity. The reaction is carried to the point where the high molecular weight resins formed are still just water-soluble and have a viscosity of more than or equal to 300 mPa.sec when measured at 20° C. on a 20% aqueous solution. It is preferred to aim at obtaining resins having viscosities of from 400 to 2,500 mPa.sec. The reaction is generally carried out at temperatures of from 20° C. to 100° C. and preferably from 40° to 80° C. over from 1 to 15 hours. The condensation reaction is advantageously carried out at a pH above 8 and preferably at from pH 9 to 11.

The condensates of the invention are basic on account of the amino groups contained therein. However, the effectiveness of the products of the invention as drainage aids, flocculants and retention aids is not affected by neutralization of the resinous solution with aids. In the majority of cases, they have the same advantages as the products described in U.S. Pat. No. 3,642,572, that is to say they can be used in both the acid and the alkaline pH range. Compared with products consisting of basically crosslinked polyamidoamines or crosslinked 1,2-polyalkylene polyamines using epichlorohydrin alone, the present products show improved properties as regards the retention of fillers, the drainage rate and the flocculation or floatation in pulp recovery processes involved in papermaking. There is also frequently an unexpected improvement in said properties over the products of U.S. Pat. No. 3,642,572. Particular mention may be made of the greatly improved whiteness of the papers obtained, which show far less tendency to yellow even when stored for relatively long periods. The present products may be used in any pH range encountered in papermaking. Like the products of U.S. Pat. No. 3,642,572, they are more universally applicable than the products of German Published Application No. 1,546,290, which are merely useful to a limited extent as floatation agents in waste waters coming from papermaking machines.

The products of the invention may be successfully used in the manufacture of paper of all kinds, in an amount of from about 0.01 to about 0.3% by weight of the weight of dry pulp, and of sized and unsized cardboard materials, in the presence or absence of aluminum sulfate.

In the following Examples the parts and percentges are by weight.

EXAMPLES (A) Manufacture of polyethylene glycol ether-bis-β-hydroxy-γ-chloropropyl ether I parts of a polyethylene glycol ether having an average molecular size of II ethylene oxide units (hydroxyl number III), (water content IV as measured according to K. Fischer in % w/w) are mixed with V parts of epichlorohydrin and VI parts of borofluoride diethyl etherate are added and then, at a temperature of from 60° to 75° C., a further VII parts of epichlorohydrin are added over from about 0.5 to 1.5 hours. Condensation is continued at from 60° to 70° C. until the epoxide titer of the solution has dropped to 0 (VIII hours). The resulting product has a chlorohydrin content of IX in equivalents per gram (boiling for 30 minutes with 0.1N caustic soda followed by back-titration) and an acid content of X milliequivalents per gram.

| Designation | V 1 | V 2 | V 3 | V 4 | V 5 |
|---|---|---|---|---|---|
| moles of epichlorohydrin per mole of polyethylene glycol 1 : | 3.0 | 2.2 | 3.0 | 2.6 | 3.0 |
| I | 3312 | 4050 | 4050 | 4542 | 4774 |
| II | 9 | 18 | 18 | 34 | 90 |
| III | 266 | 136 | 145 | 83.5 | 29 |
| IV | 0.10 | 0.22 | 0.017 | 0.03 | 0.04 |
| V | 222 | 102 | 139 | 72 | 33 |
| VI | 6.6 | 8.1 | 8.1 | 9.1 | 12.0 |
| VII | 1998 | 916 | 1148 | 650 | 300 |
| VIII | 3.2 | 4.0 | 5.7 | 5 | 4 |
| IX | 3.52 | 2.00 | 2.24 | 1.33 | 0.54 |
| X | 0.0097 | 0.0085 | 0.006 | 0.008 | 0.013 |

(B) Manufacture of polyamidoamines V 6 (reaction product of glutaric acid and diethylene triamine)

660 Parts of glutaric acid are added to 566.6 parts (molar ratio 1:1.1) of diethylene triamine in an atmosphere of nitrogen over 20 minutes with thorough stirring. The temperature of the reaction mixture rises to about 130° C. The temperature of the reaction melt is then raised to from 158° to 160° C. over about 2 hours and then to 170° C. over a further hour, the water formed being distilled off during condensation (172 parts of distillate). After the bottoms temperature has been maintained at 170° C. for 2.5 hours, the acid number of the resin has dropped to 5.5. It is cooled and 1,040 parts of water are slowly added after the temperature has reached 150° C. The pale-colored aqueous resin solution has the following properties:

water content (K. Fischer) 49.7%
acid number 3.54
amine number in glacial acetic acid titrated with perchloric acid: 4.05 milliequivalents per gram
viscosity of 45% solution at 20° C. (Hoeppler falling ball method): 196 centipoises.

Manufacture of V 7 (reaction product of adipic acid and diethylene triamine)

1,044 parts of water and 2,150 parts of diethylene triamine are mixed together under nitrogen at room temperature, and 2,800 parts of adipic acid are then added below 80° C. with cooling. The bottoms temperature is raised to 170° C. over 5 hours, during which period the water added and the water formed during condensation is distilled off, and this temperature is maintained until the resin has an acid number of less than 10 (9.8) (after about 10 hours at 170° C.). The mixture is then cooled and 3,100 parts of water are added to the viscous resin after the temperature has reached about 130° to 140° C. The aqueous resin solution has the following properties:

water content (K. Fischer): 38.6% (solids content: 61.4%)
acid number: 10.3 based on 100% product
amine content (in glacial acetic acid titrated with perchloric acid): 5.3 milliequivalents per gram based on 100% product
viscosity (45% solution at 20° C., Hoeppler falling ball method): 202 centipoises.

Manufacture of V 8 (reaction product of adipic acid and dipropylene triamine)

585 Parts of diproplyene triamine dissolved in 300 parts of water are mixed with 584 parts of adipic acid under a blanket of nitrogen. The temperature of the aqueous solution rises to about 120° C. The condensation temperature is then raised to 150° C. over 5 hours and then to 165°–170° C. over 2 hours and is maintained at this value for a further 9 hours. Evaporated bases are replaced during the final 9 hours of condensation by the dropwise addition of 67 parts of dipropylene triamine. Following condensation, the resin has an acid number of 9.2. It is cooled and 440 parts of water are added when the temperature has reached 130° C.

Solids content (Heidbrink/see "Fette und Seifen" 53 (5), 1951, page 291: 0.3 g, 60 min. 80° C.): 69.4%
amine number: 3.94 milliequivalents per gram
acid number: 8.6
viscosity of 45% aqueous solution at 20° C. (Hoeppler falling ball method): 300 cp
$n_D^{20}$: 1.4259 (45% solution).

Manufacture of V 9 (methyl adipate - dipropylene triamine)

585 Parts of dipropylene triamine are mixed with 696 parts of dimethyl adipate under nitrogen at from 80° to 85° C. Amidization is effected by raising the bottoms temperature to from 168° to 170° C. over 5 hours and distilling off the methanol formed. After a further two hours at 168°–170° C., the total amount of distillate is 252 parts. The viscous resin is cooled and about 1,000 parts of water are added when the temperature has reached 140° C. The properties of the product are as follows:

water content (K. Fischer): 48.6%
solids content (Heidbrink, see V 8 above): 50.9% amine content (in glacial acetic acid titrated with HClO$_4$): 2.96 milliequivalent/g
viscosity of 45% aqueous solution of 20° C. (Hoeppler falling ball method): 151 cp
$n_D^{20}$ of 45% solution: 1.4259.

Manufacture of V 10/11 (adipic acid + tetraethylene pentamine (+ ethylenediamine))

692 Parts of tetraethylene pentamine (529 parts of tetraethylene pentamine and 113 parts of ethylene diamine) are dissolved in 300 (400) parts of water and mixed with 438 (584) parts of adipic acid. The temperature of the reaction solution rises to more than 100° C. The bottoms temperature is raised to from 160° to 170° C. over 6 hours with distillation of the water and is maintained at this value for about a further 7 hours. The amount of distillate produced during condensation is 383 parts (540 parts), the amine content of the distillate being 0.78 (1.34) milliequivalents per g. Condensation of the resin is stopped at an acid number of 10.0 (10.7), after which the resin is cooled, and, when the temperature has reached 140° C., 1,000 parts (1,050 parts) of water are added thereto. The properties of the products are as follows:

|  | V 10 | V 11 |
|---|---|---|
| water content (K. Fischer) | 49.9% | 50.4% |
| solids content (Heidbrink) | 50.2% | 49.9% |
| amine content | 5.65 meq/g | 4.10 meq/g |
| acid content | 0.088 meq/g | 0.096 meq/g |
| viscosity (45% solution/20° C, Hoeppler falling ball method) | 721 cp | 882 cp | manufacture of V 12 (adipic acid + diethylene triamine - hexamethylene diamine adiphate ("AH salt")

584 Parts of adipic acid and 204 parts of AH salt are added to 458 parts of diethylene triamine and 458 parts of water under nitrogen, during which process the temperature rises to about 120° C. This bottoms temperature is then raised to 165°-175° C. over 5 to 6 hours. Condensation is continued for a further 8 hours at about 170° C. until the acid number of the resin has fallen to 9.9. The distillate formed (642 parts) contains 0.103 equivalent of base. The pale-colored viscous resin is cooled and, when the temperature has reached 140° C., is diluted with 1,100 parts of water. The product has the following properties:

| water content (K. Fischer): | 51.2% |
|---|---|
| solids content (Heidbrink): | 48.6% |
| amine content: | 2.4 milliequivalents per g |
| acid content: | 0.068 milliequivalents per g |
| viscosity (20° C, aqueous solution, Hoeppler falling ball method): | 422 cp |
| $n_D^{20}$(45% solution): | 1.4234 |

Manufacture of V 13/(14) (according to German Published Application No. 1,802,435)

326 Parts of the 61.4 % resin V 7 are mixed with 4.5 parts of concentrated sulfuric acid in 50 (70) parts of water and the mixture is heated to 80° C. The mixture is stirred well and 800 (200) parts of 50% aqueous ethylene imine are added over from 4 to 5 hours, the temperature of the resin solution then being maintained at from 80° to 90° C. for a further 2 to 3 hours (until no further aziridine ring can be detected with p-nitrobenzyl pyridine). The products have the following properties:

|  | V 13 | V 14 |
|---|---|---|
| water content (K. Fischer): | 48.4% | 49.2% |
| (solids content): | (51.6% | 50.8%) |
| amine content (in glacial acetic acid titrated with perchloric acid): | 7.1 meq/g | 5.2 meq/g |
| $n_D^{20}$ (45% solution): | 1.4389 | 1.3229 |
| viscosity (20° C, 45% solution, Hoeppler falling ball method) | 822 cp | 393 cp |

(C) Manufacture of Condensation Products

EXAMPLES 1 to 14

A parts of the b% aqueous solution of polyamidoamine V c are diluted with d parts of water and the now e% solution is heated to f° C. i parts of a 20% aqueous solution of crosslinker V k are added to the resin at h° C. over g hours, during which addition the pH of the reaction solution is maintained at m by the addition of 1 parts of 50% W/w caustic soda solution. The crosslinker solution is added in portions of reducing magnitude as the resin formation progresses. The rate of addition of the crosslinker depends on the final viscosity desired. Since these resins show no "Newton flow," the viscosity is measured at two different shear gradients (the value given is that obtained after rotation for 3 minutes). At a shear gradient of 24.5 sec$^{-1}$ the viscosity of the resin at the end of crosslinking is n cP (20° C.) and at a shear gradient of 69.5 sec$^{-1}$ it is p cP (20° C.) using a rotary viscometer by Haake, Berlin). The pH of the resin is q. The resin solution is neutralized with r parts of 85% formic acid to pH 8.0 and is then diluted with s parts of water to a an active content (WS)* of 18%. The final product shows a viscosity of t cP at 20° C. at a shear gradient of 24.5 sec$^{-1}$ or of u cP at 20° C. at a shear gradient of 69.5 sec$^{-1}$.

*Caustic soda, formic acid and water are not regarded as active ingredients.

v parts of crosslinker (100%) are introduced per part of polyamidoamine resin (100%) to effect crosslinking.
6 *Caustic soda, formic acid and water are not regarded as active ingredients.

TABLE

| Ex. | 1 | 2 | 3 | 4 | 5 | 6 | 7 | 8 | 9 |
|---|---|---|---|---|---|---|---|---|---|
| a | 800 | 390 | 326 | 326 | 228 | 252 | 356 | 350 | 350 |
| b | 20 | 61.4 | 61.4 | 61.4 | 61.4 | 69.4 | 51 | 50.1 | 49.6 |
| c | 6 | 7 | 7 | 7 | 7 | 8 | 9 | 10 | 11 |
| d | 0 | 810 | 674 | 674 | 472 | 623 | 552 | 525 | 518 |
| e | (20) | 20 | 20 | 20 | 20 | 20 | 20 | 20 | 20 |
| f | 70 | 70 | 55 | 70 | 60 | 60 | 40 | 60 | 50 |
| g | 14 | 8 | 5.6 | 6.8 | 9.5 | 9.2 | 2.8 | 5.1 | 6.5 |
| h | 50–70 | 67–70 | 55–70 | 66–74 | 60–74 | 60–67 | 67–70 | 66–70 | 68–72 |

TABLE-continued

| | | | | | | | | | |
|---|---|---|---|---|---|---|---|---|---|
| i | 652 | 428 | 475 | 785 | 1280 | 689 | 618 | 795 | 270 |
| k | 4 | 1 | 3 | 4 | 5 | 4 | 2 | 4 | 4 |
| l | 16.7 | 20.0 | 18.5 | 17.0 | 15.0 | 10.0 | 20.0 | 17.5 | 6.0 |
| m | 10.6–9.1 | 10.2–9.2 | 10.7–9.3 | 10.5–9.1 | 10.5–9.3 | 10.5–9.6 | 10.9–9.8 | 10.5–9.2 | 10.5–9.2 |
| n | 1363 | 1055 | 883 | 1635 | 1280 | 1180 | 1290 | 1291 | 1035 |
| p | 903 | 806 | 683 | 1144 | 926 | 877 | 901 | 921 | 745 |
| q | 10.2 | 10.1 | 10.7 | 10.3 | 10.1 | 9.9 | 10.8 | 10.5 | 10.3 |
| r | 20.3 | 20 | 26 | 28 | 14 | 25.3 | 41 | 42 | 33 |
| s | 144 | 150 | 146 | 183 | 191 | 139 | 111 | 122 | 87 |
| t | 1055 | 700 | 622 | 1371 | 1153 | 819 | 691 | 963 | 818 |
| u | 673 | 527 | 478 | 895 | 773 | 618 | 539 | 691 | 582 |
| v | 0.81 | 0.35 | 0.47 | 0.78 | 1.83 | 0.79 | 0.68 | 0.91 | 0.31 |

| Ex. | 10 | 11 | 12 | 13 | 14 |
|---|---|---|---|---|---|
| a | 300 | 400 | 400 | 400 | 400 |
| b | 48 | 51.6 | 51.6 | 50.8 | 50.8 |
| c | 12 | 13 | 13 | 14 | 14 |
| d | 430 | 630 | 630 | 620 | 620 |
| e | 20 | 20 | 20 | 20 | 20 |
| f | 70 | 70 | 65 | 65 | 65 |
| g | 3.2 | 10.6 | 10.5 | 9.8 | 8.5 |
| h | 68–73 | 60–70 | 60–66 | 60–68 | 62–70 |
| i | 473 | 326 | 616 | 508 | 1016 |
| k | 4 | 4 | 5 | 4 | 5 |
| l | 8.5 | 8.0 | 0 | 6.0 | 0 |
| m | 10.2–9.6 | 10.6–9.6 | 10.7–9.2 | 10.5–9.1 | 10.5–9.4 |
| n | 1164 | 1525 | 1220 | 1400 | 1218 |
| p | 885 | 1035 | 862 | 1010 | 873 |
| q | — | 9.8 | 9.2 | 9.6 | 9.4 |
| r | 14.5 | 84 | 79 | 49 | 45 |
| s | 112 | 60 | 105 | 113 | 179 |
| t | 689 | 1000 | 764 | 910 | 855 |
| u | 514 | 738 | 572 | 652 | 642 |
| v | 0.65 | 0.32 | 0.60 | 0.50 | 1.0 |

(D) Application

The following Tables present a comparison of the papermaking properties of our products compared with those of a modified polyethyleneimine (PEI) prepared according to Examples of German Published Application No. 1,802,435.

Measuring methods:

Acceleration of Drainage

This is characterized by the reduction in freeness in °SR. The freeness in °SR is determined according to the Leaflet 107 of the Verein der Zellstoff- und Papierchemiker und Ingenieure.

Filler Retention

This is characterized by the ash content of sheets of paper produced on a Koethen apparatus according to Leaflet 108 of the Verein der Zellstoff- und Papierchemiker und Ingenieure.

| Composition of pulp of paper to be tested: | 80% of bleached sulfite cellulose 35° SR |
|---|---|
| pulp density: | 20% of China clay<br>0.24 g/l |

Influence on paper whiteness and effect on optical brighteners

This is characterized by the whiteness of ash-free sheets of paper:

| composition of pulp: | 100% of bleached sulfite cellulose (35° SR)<br>0.15% of optical brightener<br>0.5% of alum<br>0.06% of resin additive |
|---|---|
| Measurement: | percentage reflectance measured in known manner with a Zeiss-Elrepho instrument, filter R46T with and without UV excitation. |

TABLE 1a:

Drainage acceleration (measured as reduction in freeness in °SR)
Material: newspapers (beaten in an Ultraturrax unit to a smooth composition)

| | pH 1.3 | | pH 3 | 1.5% of alum |
|---|---|---|---|---|
| Additive (100% resin, based on absolutely dry cellulose) | 0.05 | 0.1% | 0.05 | 0.1% |
| Control value (no resin added) (° SR) | 79.5 | | 72.3 | |
| Modified PEI (according to Example 6 of German Published Application 1,802,435) | 48.6 | 38.4 | 39.8 | 36.0 |
| Resin of Example 1 | 40.6 | 31.1 | 36.9 | 31.0 |

TABLE 1b:

Filler retention: ash content of paper in %, addition of resin (100%): 0.015% and 0.03%, based on cellulose and filler

| pH of fiber suspension: | 6 | 4.8 | |
|---|---|---|---|
| Alum added, based on cellulose and filler: | 0.5% | 1.5% | |
| Control value: | 3.5 | 3.0 | % of ash in |
| Modified PEI (of Ex. 6 of German Published Application 1,802,435): | | | |
| 0.015% addition | 5.5 | 6.3 | |
| 0.03% addition | 7.6 | 7.0 | |
| Resin of Example 1: | | | |
| 0.015% addition | 5.5 | 6.3 | |
| 0.03% addition | 6.9 | 7.0 | |

TABLE 1c:

Influence on paper whiteness and effect on optical brighteners

| | Control value | resin of Ex. 6 of German Published Application 1,802,435 | Resin of Example 1 |
|---|---|---|---|
| with UV | 93.2% | 80.7 | 88.3% |
| without UV | 87.0% | 78.6 | 84.0% |

TABLE 2a:

Drainage acceleration (measured as reduction in freeness in ° SR)
Material: newspapers (beaten in an Ultraturrax unit to a smooth composition)

|  | pH 7.2 |  | pH 5 | 1.5% of alum |
|---|---|---|---|---|
| Additive (100% resin, based on absolutely dry cellulose) | 0.05 | 0.1% | 0.05 | 0.1% |
| Control value (no resin added) (° SR) | 79 |  | 77 |  |
| Modified PEI (according to Example 1 of German Published Application 1,802,435) | 51.7 | 35.7 | 39.8 | 36.1 |
| Resin of Example 2 | 46.5 | 31.5 | 38.5 | 35.0 |

TABLE 2b:

Filler retention: ash content of paper in %, addition of resin (100%): 0.015% and 0.03%, based on cellulose and filler

| pH of fiber suspension: | 6 | 4.8 | |
|---|---|---|---|
| Alum added, based on cellulose and filler: | 0.5% | 1.5% | |
| Control value: | 3.7 | 3.5 | |
| Modified PEI (of Ex. 1 of German Published Application 1,802,435): | | | % of ash in paper |
| 0.015% addition | 5.4 | 9.6 | |
| 0.03% addition | 7.9 | 11.0 | |
| Resin of Example 2: | | | |
| 0.015% addition | 5.2 | 10.6 | |
| 0.03% addition | 7.6 | 11.0 | |

TABLE 2c:

Influence on paper whiteness and effect on optical brighteners

| Control value | Resin of Ex. 1 of German Published Application 1,802,435 | Resin of Example 2 |
|---|---|---|
| with UV 91.2% | 80.7% | 88.7% |
| without UV 86.4% | 77.9% | 85.0% |

TABLE 3a:

Drainage acceleration (measured as reduction in freeness in ° SR)
Material: newspapers (beaten in an Ultraturrax unit to a smooth composition)

|  | pH 7.0 |  | pH 5 | 1.5% of alum |
|---|---|---|---|---|
| Additive (100% resin, based on absolutely dry cellulose) | 0.05 | 0.1% | 0.05 | 0.1% |
| Control value (no resin added) (° SR) | 60 |  | 62 |  |
| Modified PEI (according to Example 6 of German Published Application 1,802,435) | 47 | 41 | 54 | 50 |
| Resin of Example 3 | 45 | 39 | 51 | 47 |

TABLE 3b:

Filler retention: ash content of paper in %, addition of resin (100%): 0.015% and 0.03%, based on cellulose and filler

| pH of fiber suspension: | 6 | 4.8 | |
|---|---|---|---|
| Alum added, based on cellulose and filler: | 0.5% | 1.5% | |
| Control value: | 3.1 | 2.9 | |
| Modified PEI (according to Example 6 of German Published Application 1,802,435 | | | |
| 0.015% addition | 3.9 | 5.6 | % of ash in paper |
| 0.03% addition | 5.4 | 6.6 | |
| Resin of Example 3: | | | |
| 0.015% addition | 5.1 | 7.2 | |
| 0.03% addition | 7.2 | 8.8 | |

TABLE 3c:

Influence on paper whiteness and effect on optical brighteners

| Control value | Resin of Ex. 6 of German Published Appl 1,802,435 | Resin of Example 3 |
|---|---|---|
| with UV 92.7% | 79.5% | 87.8% |
| without UV 86.8% | 77.3% | 83.6% |

TABLE 4a:

Drainage acceleration (measured as reduction in freeness in ° SR)
Material: newspapers (beaten in an Ultraturrax unit to a smooth composition)

|  | pH 7.3 |  | pH 5 | 1.5% of alum |
|---|---|---|---|---|
| Additive (100% resin, based on absolutely dry cellulose) | 0.05 | 0.14% | 0.05 | 0.1% |
| Control value (no resin added) (° SR) | 67 |  | 68 |  |
| Modified PEI (according to Example 6 of German Published Application 1,802,435) | 58 | 46 | 50 | 44 |
| Resin of Example 4 | 57 | 46 | 49 | 42 |

TABLE 4b:

Filler retention: ash content of paper in %, addition of resin (100%): 0.015% and 0.03%, based on cellulose and filler

| pH of fiber suspension: | 6 | 4.8 | |
|---|---|---|---|
| Alum added, based on cellulose and filler: | 0.5% | 1.5% | |
| Control value: | 1.9 | 3.2 | |
| Modified PEI (of Ex. 6 of German Published Application 1,802,435): | | | % of ash in paper |
| 0.015% addition | 2.6 | 5.7 | |
| 0.03% addition | 5.0 | 6.2 | |
| Resin of Example 4: | | | |
| 0.015% addition | 5.7 | 5.8 | |
| 0.03% addition | 7.6 | 6.9 | |

TABLE 4c:

Influence on paper whiteness and effect on optical brighteners

| Control value | Resin of Ex. 6 of German Published Appl 2,802,435 | Resin of Example 4 |
|---|---|---|
| with UV 93.2% | 80.7% | 88.1% |
| without UV 87.0% | 78.6% | 83.1% |

TABLE 5a:

Drainage acceleration (measured as reduction in freeness in ° SR)
Material: newspapers (beaten in an Ultraturrax unit to a smooth composition)

|  | pH 7.3 |  | pH 5 | 1.5% of alum |
|---|---|---|---|---|
| Additive (100% resin, based on absolutely dry cellulose) | 0.05 | 0.1% | 0.05 | 0.1% |
| Control value (no resin added) (° SR) | 62 |  | 60 |  |
| Modified PEI (according to Example 3B of German Published Application 1,802,435) | 47 | 41 | 54 | 50 |

TABLE 5a:-continued

Drainage acceleration (measured as reduction in freeness in ° SR)
Material: newspapers (beaten in an Ultraturrax unit to a smooth composition)

|  | pH 7.3 | pH 5 | 1.5% of alum |
|---|---|---|---|
| Resin of Example 5 | 46 40 | 55 | 53 |

TABLE 5b:

Filler retention: ash content of paper in %, addition of resin (100%): 0.015% and 0.03%, based on cellulose and filler

| pH of fiber suspension: | 6 | 4.8 | |
|---|---|---|---|
| Alum added, based on cellulose and filler: | 0.5% | 65% | |
| Control value: | 3.1 | 2.9 | |
| Modified PEI (according to Example 3B of German Published Application 1,802,435 | | | |
| 0.015% addition | 3.9 | 5.6 | % of ash in paper |
| 0.03% addition | 5.4 | 6.6 | |
| Resin of Example 6: | | | |
| 0.015% addition | 4.2 | 6.7 | |
| 0.03% addition | 5.7 | 7.6 | |

TABLE 5c:

Influence on paper whiteness and effect on optical brighteners

| Control value | Resin of Ex. 3B of German Published Appl. 1,802,435 | Resin of Example 5 |
|---|---|---|
| with UV 93.2% | 83.3% | 88.8% |
| without UV 87.0% | 80.1% | 83.7% |

TABLE 6a:

Drainage acceleration (measured as reduction in freeness in ° SR)
Material: newspapers (beaten in an Ultraturrax unit to a smooth composition)

|  | pH 7.3 | | pH 5 | 1.5% of alum |
|---|---|---|---|---|
| Additive (100% resin, based on absolutely dry cellulose) | 0.05 | 0.1% | 0.05 | 0.01% |
| Control value (no resin added) (° SR) | 62 | | | 61 |
| Modified PEI (according to Example 6 of German Published Application 1,802,435) | 49 | 44 | 54 | 50 |
| Resin of Example 6 | 48 | 42 | 44 | 38 |

TABLE 6b:

Filler retention: ash content of paper in %, addition of resin (100%): 0.015% and 0.03% based on cellulose and filler

| pH of fiber suspension: | 6 | 4.8 | |
|---|---|---|---|
| Alum added, based on cellulose and filler: | 0.5% | 1.5% | |
| Control value: | 3.5 | 3.1 | |
| Modified PEI (according to Example 6 of German Published Application 1,802,435 | | in | % of ash paper |
| 0.015% addition | 4.2 | 6.2 | |
| 0.03% addition | 6.6 | 7.1 | |
| Resin of Example 6: | | | |
| 0.015% addition | 4.9 | 6.0 | |
| 0.035 addition | 6.4 | 6.9 | |

TABLE 6c:

Influence on paper whiteness and effect on optical brighteners

| Control value | Resin of Ex. 6 of German Published Appl. 1,802,435 | Resin of Example 6 |
|---|---|---|
| with UV 93.2% | 80.7% | 88.8% |
| without UV 87.0% | 78.6% | 83.6% |

TABLE 7a:

Drainage acceleration (measured as reduction in freeness in ° SR)
Material: newspapers (beaten in an Ultraturrax unit to a smooth composition)

|  | pH 7.3 | pH 5 | 1.5% of alum |
|---|---|---|---|
| Additive (100% resin, based on absolutely dry cellulose) | 0.05 0.1% | 0.05 | 0.1% |
| Control value (no resin added) (° SR) | 63 | | 59 |
| Modified PEI (according to Example 6 of German Published Application 1,802,435) | 51 40 | 52 | 51 |
| Resin of Example 7 | 54 46 | 52 | 51 |

TABLE 7b:

Filler retention: ash content of paper in %, addition of resin (100%): 0.015% and 0.03%, based on cellulose and filler

| pH of fiber suspension: | 6 | 4.8 | |
|---|---|---|---|
| Alum added, based on cellulose and filler: | 0.5% | 1.5% | |
| Control value: | 3.0 | 2.7 | |
| Modified PEI (according to Example 6 of German Published Application 1,802,435 | | | % of ash in paper |
| 0.015% addition | 5.0 | 5.2 | |
| 0.03% addition | 6.7 | 6.3 | |
| Resin of Example 7: | | | |
| 0.015% addition | 5.8 | 5.0 | |
| 0.03% addition | 6.9 | 6.7 | |

TABLE 7c:

Influence on paper whiteness and effect on optical brighteners

| Control value | Resin of Ex. 6 of German Published Appl. 1,802,435 | Resin of Example 7 |
|---|---|---|
| with UV 93.2% | 80.7% | 88.0% |
| without UV 87.0% | 78.6% | 83.0% |

TABLE 8a:

Drainage acceleration (measured as reduction in freeness in ° SR)
Material: newspapers (beaten in an Ultraturrax unit to a smooth composition)

|  | pH 7.3 | pH 5 | 1.5% of alum |
|---|---|---|---|
| Additive (100% resin, based on absolutely dry cellulose) | 0.05 0.1% | 0.05 | 0.1% |
| Control value (no resin added) (° SR) | 58 | | 56 |
| Modified PEI (according to Example 1 of German Published Application 1,802,435) | 46 37 | 42 | 40 |
| Resin of Example 8 | 45 38 | 42 | 39 |

TABLE 8b:

Filler retention: ash content of paper in %, addition of resin (100%): 0.015% and 0.03%, based on cellulose and filler

| pH of fiber suspension: | 6 | 4.8 | |
|---|---|---|---|
| Alum added, based on cellulose and filler: | 0.5% | 1.5% | |
| Control value: | 3.0 | 3.0 | |
| Modified PEI (according to Example 1 of German Published Application 1,802,435 | | | % of ash in paper |
| 0.015% addition | 4.1 | 5.4 | |
| 0.03% addition | 6.2 | 6.7 | |
| Resin of Example 8: | | | |
| 0.015% addition | 5.1 | 5.6 | |
| 0.03% addition | 7.0 | 7.1 | |

TABLE 8c:

| Influence on paper whiteness and effect on optical brighteners | | |
|---|---|---|
| Control value | Resin of Ex. 1 of German Published Appl. 1,802,435 | Resin of Example 8 |
| with UV 96% | 84.5% | 88.2% |
| without UV 87.5% | 80.0% | 82.3% |

TABLE 9a:

Drainage acceleration (measured as reduction in freeness in °SR)
Material: newspapers (beaten in an Ultraturrax unit to a smooth composition)

| | pH 7.3 | | pH 5 | 1.5% of alum |
|---|---|---|---|---|
| Additive (100% resin, based on absolutely dry cellulose) | 0.05 | 0.1% | 0.05 | 0.1% |
| Control value (no resin added) (°SR) | 65 | | 63 | |
| Modified PEI (according to Example 3 of German Published Application 1,802,435) | 59 | 53 | 56 | 50 |
| Resin of Example 9 | 60 | 54 | 54 | 50 |

TABLE 9b:

Filler retention: ash content of paper in %, addition of resin (100%): 0.015% and 0.03%, based on cellulose and filler

| pH of fiber suspension: | 6 | 4.8 | |
|---|---|---|---|
| Alum added, based on cellulose and filler: | 0.5% | 1.5% | |
| Control value: | 3.2 | 3.2 | |
| Modified PEI (according to Example 3 of German Published Application 1,802,435 | | | |
| 0.015% addition | 3.7 | 6.0 | % of ash in paper |
| 0.035 addition | 6.3 | 6.8 | |
| Resin of Example 9: | | | |
| 0.015% addition | 4.4 | 7.1 | |
| 0.03% addition | 6.3 | 7.6 | |

TABLE 9c:

| Influence on paper whiteness and effect on optical brighteners | | |
|---|---|---|
| Control value | Resin of Ex. 3 of German Published Appl. 1,802,435 | Resin of Example 9 |
| with UV 96.0% | 85.8% | 88.2% |
| without UV 87.5% | 80.0% | 82.3% |

TABLE 10a:

Drainage acceleration (measured as reduction in freeness in SR°)
Material: newspapers (beaten in an Ultraturrax unit to a smooth composition)

| | pH 7.3 | | pH 5 | 1.5% of alum |
|---|---|---|---|---|
| Additive (100% resin, based on absolutely dry cellulose) | 0.05 | 0.1% | 0.05 | 0.1% |
| Control value (no resin added) (°SR) | 65 | | 63 | |
| Modified PEI (according to Example 6 of German Published Application 1,802,435) | 59 | 53 | 56 | 53 |
| Resin of Example 10 | 53 | 47 | 52 | 49 |

TABLE 10b:

Filler retention: ash content of paper in %, addition of resin (100%): 0.015% and 0.03%, based on cellulose and filler

| pH of fiber suspension: | 6 | 4.8 | |
|---|---|---|---|
| Alum added, based on cellulose and filler: | 0.5% | 1.5% | |
| Control value: | 3.2 | 3.2 | |
| Modified PEI (according to Example 6 of German Published Application 1,802,435 | | | |
| 0.015% addition | 3.7 | 6.0 | % of ash in paper |
| 0.03% addition | 6.3 | 6.8 | |
| Resin of Example 10: | | | |
| 0.015% addition | 5.2 | 7.4 | |
| 0.03% addition | 6.8 | 8.3 | |

TABLE 10c:

| Influence on paper whiteness and effect on optical brighteners | | |
|---|---|---|
| Control value | Resin of Ex. 6 of German Published Appl. 1,802,435 | Resin of Example 10 |
| with UV 93.2% | 80.7% | 88.1% |
| without UV 87.0% | 78.6% | 83.4% |

TABLE 11a:

Drainage acceleration (measured as reduction in freeness in SR°)
Material: newspapers (beaten in an Ultraturrax unit to a smooth composition)

| | pH 7.3 | | pH 5 | 1.5% of alum |
|---|---|---|---|---|
| Additive (100% resin, based on absolutely dry cellulose) | 0.05 | 0.1% | 0.05 | 0.1% |
| Control value (no resin added) (°SR) | 61 | | 56 | |
| Modified PEI (according to Example 3B of German Published Application 1,802,435) | 59 | 56 | 55 | 53 |
| Resin of Example 11 | 57 | 52 | 54 | 51 |

TABLE 11b

Filler retention: ash content of paper in %, addition of resin (100%): 0.015% and 0.03%, based on cellulose and filler

| pH of fiber suspension: | 6 | 4.8 | |
|---|---|---|---|
| Alum added, based on cellulose and filler: | 0.5% | 1.5% | |
| Control value: | 9.1 | 8.5 | |
| Modified PEI (according to Example 3B of German Published Application 1,802,435 | | | |
| 0.015% addition | 10.2 | 11.1 | % of ash in paper |
| 0.03% addition | 11.7 | 11.8 | |
| Resin of Example 11: | | | |
| 0.015% addition | 10.1 | 11.0 | |
| 0.03% addition | 12.0 | 12.3 | |

TABLE 11c:

| Influence on paper whiteness and effect on optical brighteners | | |
|---|---|---|
| Control value | Resin of Ex. 3B of German Published Appl. 1,802,435 | Resin of Example 11 |
| with UV 88.7% | 78.8% | 81.8% |
| without UV 84.2% | 76.7% | 78.8% |

TABLE 12a:

Drainage acceleration (measured as reduction in freeness in SR°)
Material: newspapers (beaten in an Ultraturrax unit to a smooth composition)

| | pH 7.3 | | pH 5 | 1.5% of alum |
|---|---|---|---|---|
| Additive (100% resin, based on absolutely dry cellulose) | 0.05 | 0.1% | 0.05 | 0.1% |
| Control value (no resin added) (°SR) | 67 | | 66 | |
| Modified PEI (according to Example 6 of German Published Application 1,802,435) | 59 | 56 | 57 | 54 |
| Resin of Example 12 | 60 | 50 | 57 | 53 |

TABLE 12b:

Filler retention: ash content of paper in %, addition of resin (100%): 0.015% and 0.03%, based on cellulose and filler

| pH of fiber suspension: | 6 | 4.8 | |
|---|---|---|---|
| Alum added, based on cellulose and filler: | 0.5% | 1.5% | |
| Control value: | 9.3 | 8.6 | |
| Modified PEI (according to Example 6 of German Published Application 1,802,435 | | | |
| 0.015% addition | 9.4 | 11.0 | % of ash in paper |
| 0.03% addition | 10.3 | 11.8 | |
| Resin of Example 12 | | | |
| 0.015% addition | 11.4 | 13.0 | |
| 0.03% addition | 12.1 | 14.4 | |

TABLE 12c:

Influence on paper whiteness and effect on optical brighteners

| Control value | Resin of Ex. 6 of German Published Appl. 1,802,435 | Resin of Example 12 |
|---|---|---|
| with UV 95.8% | 79.7% | 84.0% |
| without UV 88.9% | 77.7% | 80.7% |

TABLE 13a:

Drainage acceleration (measured as reduction in freeness in SR°) Material: newspaper (beaten in an Ultraturrax unit to a smooth composition)

| | pH 7.3 | | pH 5 | 1.5% of alum |
|---|---|---|---|---|
| Additive (100% resin, based on absolutely dry cellulose) | 0.05 | 0.1% | 0.05 | 0.1% |
| Control value (no resin added) (° SR) | 65 | | 62 | |
| Modified PEI (according to Example 1 of German Published Application 1,802,435) | 59 | 48 | 52 | 49 |
| Resin of Example 13 | 57 | 47 | 50 | 50 |

TABLE 13b:

Filler retention: ash content of paper in %, addition of resin (100%): 0.015% and 0.03%, based on cellulose and filler

| pH of fiber suspension: | 6 | 4.8 | |
|---|---|---|---|
| Alum added, based on cellulose and filler | 0.5% | 1.5% | |
| Control value: | 2.1 | 2.4 | |
| Modified PEI (according to Example 1 of German Published Application 1,802,435 | | | |
| 0.015% addition | 3.1 | 5.5 | % of ash in paper |
| 0.3% addition | 5.3 | 6.5 | |
| Resin of Example 13 | | | |
| 0.015% addition | 4.6 | 5.6 | |
| 0.03% addition | 6.5 | 6.5 | |

TABLE 13c:

Influence on paper whiteness and effect on optical brighteners

| Control value | Resin of Ex. 1 of German Published Appl. 1,802,435 | Resin of Example 13 |
|---|---|---|
| with UV 95.8% | 82.6% | 84.0% |
| without UV 88.9% | 78.8% | 80.7% |

TABLE 14a

Drainage acceleration (measured as reduction in freeness in SR°) Material: newspapers (beaten in an Ultraturrax unit to a smooth composition)

| | pH 7.3 | | pH 5 | 1.5% of alum. |
|---|---|---|---|---|
| Additive (100% resin, based on absolutely dry cellulose) | 0.05 | 0.1% | 0.05 | 0.1% |
| Control value (no resin added) (° SR) | 66 | | 65 | |
| Modified PEI (according to Example 6 of German Published Application 1,802,435) | 58 | 50 | 56 | 53 |
| Resin of Example 14 | 57 | 51 | 54 | 51 |

TABLE 14b:

Filler retention: ash content of paper in %, addition of resin (100%): 0.015% and 0.03%, based on cellulose and filler

| pH of fiber suspension: | 6 | 4.8 | |
|---|---|---|---|
| Alum added, based on cellulose and filler: | 0.5% | 1.5% | |
| Control value: | 2.2 | 2.4 | |
| Modified PEI (according to Example 6 of German Published Application 1,802,435 | | | |
| 0.015% addition | 4.9 | 50.0 | % of ash in paper |
| 0.03% addition | 7.0 | 6.3 | |
| Resin of example 14 | | | |
| 0.015% addition | 5.3 | 5.1 | |
| 0.03% addition | 6.7 | 5.9 | |

TABLE 14c:

Influence on paper whiteness and effect on optical brighteners

| Control value | Resin of Ex. 6 of German Published Appl. 1,802,435 | Resin of Example 14 |
|---|---|---|
| with UV 88.7% | 77.6% | 81.8% |
| without UV 84.2% | 75.9% | 78.8% |

EXAMPLE 15

As under (B), V 7, above, a condensation product of adipic acid and diethylene triamine is prepared. This condensate is then grafted with ethyleneimine in a ratio of 1:1, by weight, as in the case of V 13/14 above. The resulting reaction product has a viscosity of 400 centipoises at a temperature of 20° C. in 45% aqueous solution. This condensation product is referred to below as component (a).

Component (b) is prepared as under (A) of the above Examples by reacting a polyglycol ether having a molecular weight of 1,500 with epichlorohydrin in a ratio of 6.8:1 by weight.

Condensation of components (a) and (b):

500 parts of a 23.5% aqueous solution of components (a) are placed in a reaction vessel provided with a stirrer and heated to 65° C. 130 parts of a 20.5% aqueous solution of component (b) are added and the mixture is condensed at a temperature ranging from 60° to 65° C. until the viscosity is 50 centipoises. When this viscosity has been reached, 12 parts of a mixture previously prepared by combining equal parts by weight of the above described 23.5% aqueous solution of component (a) and the 20.5% aqueous solution of component (b) are added to the mixture every ten minutes.

After a total of 290 parts of that mixture have been added, the viscosity of the condensate has risen to 200 centipoises. There is then added to the reaction mixture, every ten minutes, a mixture consisting of 6 parts of the above component (a) and 3 parts of the above component (b). After 54 parts of that mixture have been added and condensation has been continued at a temperature of from 60° to 65° C., the viscosity of the condensate has risen to 900 centipoises. The reaction product is adjusted to pH 8 with 85% formic acid and then diluted with water to a solids content of 20%.

There is obtained a clear aqueous resin solution containing virtually no insoluble particles which have been condensed too far. This resin solution is used in the paper industry as drainage aid.

EXAMPLE 16

Example 15 is repeated except that the component (a) used is a condensation product obtained by reacting the reaction product of adipic acid and diethylene triamine with ethyleneimine in a ratio of 1:2 by weight.

Here again, there is obtained a resin solution containing virtualy no insoluble particles. The resin solution is used in the paper industry as flocculant.

EXAMPLE 17

The components (a) and (b) given in Example 15 are condensed with each other in the following manner: 500 parts of component (a) in the form of a 23.5% aqueous solution are placed in a vessel provided with stirrer and heated to a temperature of 70° C. 130 parts of component (b) are added in the form of a 20.5% aqueous solution. The two components are first condensed batchwise until a viscosity of 50 centipoises is obtained. Further quantities of components (a) and (b) are then added through computer-controlled metering orifices. Before components (a) and (b) reach the condensation vessel, they are mixed in a small mixer.

The ratio of component (a) to component (b) is 1:1 up to the point where the viscosity of the condensate is 120 centipoises and is then continuously reduced to a ratio of 1:0.6 until the viscosity of the condensate is 250 centipoises and is thereafter continuously reduced to 1:0.3 until the viscosity is 700 centipoises. A total of 250 parts of component (a) and 200 parts of component (b), based on solid, is required. The condensate is then adjusted to pH 8 with 85% formic acid and diluted with water to a solids content of 20%. The condensation product is used in the paper industry as retaining agent. It contains no insoluble particles.

We claim:

1. A process for manufacture of paper, which comprises adding to an aqueous suspension of cellulosic fibers for making paper sheet as a drainage and/or retention aid, from about 0.01 to 0.3% by weight, based on the weight of dry pulp, of a water-soluble cross-linked reaction product obtained by reacting
    (a) 1 part by weight of an ethyleneimine-grafted polyamidoamine obtained by condensing 1 mole of a dicarboxylic acid having from 4 to 10 carbon atoms with from 0.8 to 1.4 moles of polyalkylene polyamine having from 3 to 10 alkyleneimine units, followed by grafting of from 2 to 8 ethyleneimine units per basic nitrogen atom onto the resulting polyamidoamine, with
    (b) from 0.3 to 2 parts by weight of a reaction product obtained by reacting a polyalkylene oxide having from 8 to 100 alkylene oxide units with epichlorohydrin in the presence of a Lewis acid, so that from 1.0 to 1.5 moles of epichlorohydrin are present per equivalent of hydroxyl groups in the polyalkylene oxide,
at a temperature of from 20° to 100° C. in aqueous solution or in a solution in water and a water-soluble organic solvent, the solution having a solids content of from 5 to 50% by weight, the reaction being carried to a point at which the viscosity of an aqueous solution containing 20% of the auxiliary is from 300 to 2,500 centipoises (20° C.), and thereafter forming a paper sheet from said aqueous suspension.

* * * * *